United States Patent
Kirihata et al.

(10) Patent No.: US 8,595,440 B2
(45) Date of Patent: Nov. 26, 2013

(54) FILE SERVER APPARATUS, MANAGEMENT METHOD OF STORAGE SYSTEM, AND PROGRAM

(75) Inventors: Yasuhiro Kirihata, Tokyo (JP); Hideyuki Kashiwase, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 101 days.

(21) Appl. No.: 13/257,708

(22) PCT Filed: Mar. 31, 2010

(86) PCT No.: PCT/JP2010/055795
§ 371 (c)(1),
(2), (4) Date: Sep. 20, 2011

(87) PCT Pub. No.: WO2011/121746
PCT Pub. Date: Oct. 6, 2011

(65) Prior Publication Data
US 2012/0226869 A1   Sep. 6, 2012

(51) Int. Cl.
*G06F 12/00* (2006.01)
*G06F 13/00* (2006.01)

(52) U.S. Cl.
USPC .................. 711/126; 711/E12.002; 707/827

(58) Field of Classification Search
USPC ........................... 711/126, E12.002; 707/827
See application file for complete search history.

(56) References Cited

U.S. PATENT DOCUMENTS

| | | | |
|---|---|---|---|
| 6,101,558 A | 8/2000 | Utsunomiya et al. | |
| 6,347,343 B1 | 2/2002 | Utsunomiya et al. | |
| 6,691,177 B2 | 2/2004 | Utsunomiya et al. | |
| 7,818,287 B2 | 10/2010 | Torii et al. | |
| 8,219,752 B1* | 7/2012 | Jenkins et al. | 711/118 |
| 2003/0061352 A1 | 3/2003 | Bohrer et al. | |
| 2006/0129537 A1 | 6/2006 | Torii et al. | |
| 2007/0204119 A1 | 8/2007 | Murotani et al. | |
| 2009/0125522 A1 | 5/2009 | Kodama et al. | |
| 2010/0179973 A1* | 7/2010 | Carruzzo | 707/827 |
| 2010/0191785 A1* | 7/2010 | Serlet et al. | 707/827 |

FOREIGN PATENT DOCUMENTS

| | | |
|---|---|---|
| JP | 7-319750 A | 12/1995 |
| JP | 11-15720 A | 1/1999 |
| JP | 2001-318902 A | 11/2001 |
| JP | 2006-164211 A | 6/2006 |
| JP | 2007-226596 A | 9/2007 |
| JP | 2009-110401 A | 5/2009 |

OTHER PUBLICATIONS

G. Ganger et al., Soft Updates: A Solution to the Metadata Update Problem in File Systems, ACM Transaction on Computer Systems, vol. 18, No. 2, May 2000, pp. 127-153.

(Continued)

*Primary Examiner* — Edward Dudek, Jr.
(74) *Attorney, Agent, or Firm* — Mattingly & Malur, PC (57) ABSTRACT

When a storage capacity of a file server is expanded using an online storage service, elimination of an upper-limit constraint of the file size as a constraint of the online storage service and reduction in the communication cost are realized. A kernel module including logical volumes on the online storage service divides a file into block files at a fixed length and stores and manages the block files to prevent the upper-limit constraint of the file size. When a READ/WRITE request is generated for a mounted file system, only necessary block files are downloaded and used from the online storage service based on an offset value and size information to optimize the communication and realize the communication cost reduction.

12 Claims, 9 Drawing Sheets

OTHER PUBLICATIONS

G. Ganger et al., Soft Updates: A Solution to the Metadata Update Problem in File Systems, ACM Transaction on Computer Systems, vol. 16, No. 2, May 2000, pp. 127-153.

Extended EP Search Report in EP App. No. 10847629.2-1959, dated Aug. 19, 2013.

* cited by examiner

FILE SERVER APPARATUS, MANAGEMENT METHOD OF STORAGE SYSTEM, AND PROGRAM

TECHNICAL FIELD

The present invention relates to a file server apparatus, a management method of a storage system, and a program, and for example, relates to a technique for acquiring a file stored in an external storage service to provide the file to a user terminal.

BACKGROUND ART

A new IT application called cloud computing is drawing attention as a big flow of IT trend of recent years. STaaS (Storage as a service) as an example of the IT application which provides a storage service via the Internet is proliferating. The STaaS is a service of providing a logical storage capacity at a low price, and the STaaS generally provides an external interface for using the storage service in a Web interface format, such as REST and SOAP. Although problems, such as security and compliance, remain in the STaaS, the cost reduction is prioritized, and the use of the STaaS by individuals and companies is expected to increase in the future.

In general, the online storage service features an enormous scalability, but there is an upper limit to the file size that can be stored. For example, in the case of Amazon (registered trademark) S3, although there is no limit to the number of file objects that can be stored in the bucket, the maximum size of the file object is 5 GB, and a single file in a size greater than 5 GB cannot be stored (constraint condition 1). As for file reading, a partial reading process can be executed. However, as for writing, partial writing cannot be performed, and only the replacement of the file stored in the bucket is possible (constraint condition 2). For example, to rewrite a 1 MB block in a 5 GB file, all the 5 GB file needs to be downloaded to rewrite the 1 MB block, and the entire 5 GB file needs to be uploaded at the end. There is a problem that the communication cost increases. Therefore, there is a problem that data communication of an unnecessary part is generated in a Random READ/WRITE process, and the communication cost increases. The data is accessed via a WAN, and the communication speed is significantly slower than the data communication speed to a local disk or the like. There is a problem that the overhead of file listing or READ/WRITE increases in a synchronous communication.

To use the online storage service as a backup external storage of a file server or an external storage for capacity expansion, a mechanism is necessary in which the file server looks like a transparently single file server from the client, and the online storage service is connected from the file server to copy or move data. For example, Patent Literature 1 discloses an existing technique of transparently showing the file server as a single server to the client and concealing the data copy and movement. Patent Literature 2 discloses an existing technique related to the data copy and movement.

In Patent Literature 1, an intermediate apparatus is arranged between a first server including a primary storage, a second server including a secondary storage, and the client. When there is a file access to the primary storage from the client, the access request is changed to a corresponding file on the secondary storage if the access target file is a stub file (file for linking the destination). In this way, it looks as if the stub file is an entity, and the data movement from the primary storage to the secondary storage is concealed from the client.

In Patent Literature 2, updates of high-speed disk volumes are monitored to create update bit maps, OR of each update bit map is calculated to detect segments that are not updated for a predetermined time, and the data is moved from the high-speed disk volumes to low-speed disk volumes (movement between storage tires) based on the detected segment information.

CITATION LIST

Patent Literature

Patent Literature 1: JP Patent Publication (Kokai) No. 2006-164211A
Patent Literature 2: JP Patent Publication (Kokai) No. 2007-226596A

SUMMARY OF INVENTION

Technical Problem

However, in Patent Literatures 1 and 2, the online storage service cannot be used as a backup external storage of a file server or an external storage for capacity expansion while preventing the constraint conditions (1 and 2) of the online storage service. Patent Literatures 1 and 2 do not propose measures to prevent the constraints related to the file size on the online storage and do not propose measures to optimize the communication cost via the WAN.

The present invention has been made in view of the circumstances, and the present invention provides a technique for optimizing the communication cost in using an online storage service and realizing a high-speed access.

Solution to Problem

To solve the problems, a block file group with divided file data and meta-information are stored when a file is stored in an online storage service in the present invention, and in response to a file read request from a user terminal, a block file necessary in reading is downloaded from the online storage service and cached. In response to a write request from the user terminal, a block file to be written is downloaded from the online storage service and cached, and the cached write data is overwritten. The cached and changed block file and meta-information are asynchronously reflected on the online storage service.

An online storage mount module refers to a meta-information update flag, a file update flag, and a deletion flag recorded in the meta-information and sequentially executes deletion of the original file in the online storage service, file content, and meta-information in accordance with policy information, not in synchronization with (asynchronously) the process of the file server To process a write request from the user terminal, the online storage mount module reflects identification information of the updated block file on bit map information recorded in the meta-information and uses the bit map information to asynchronously update only block files that need to be uploaded to the online storage service in accordance with the policy information.

Further features of the present invention will become apparent from the embodiment for carrying out the present invention and the attached drawings.

Advantageous Effects of Invention

According to the present invention, the communication cost in using an online storage service can be optimized, and a high-speed access can be realized.

DESCRIPTION OF EMBODIMENTS

The present invention relates to, for example, a system of eliminating an upper-limit constraint in the file size stored in an external storage service and reducing the communication cost. The present invention proposes a mechanism of dividing and managing individual files in an online storage service, downloading and uploading only a necessary part in accordance with a READ/WRITE operation of file, eliminating the file-size constraint of the online storage service, and optimizing the communication cost. The present invention further provides a mechanism of locally caching the divided file blocks to speed up the file access, storing meta-information of the files on the online storage service in the file server, changing file listing and the meta-information such as file names and directory configurations, and realizing high-speed READ/WRITE.

Hereinafter, an embodiment of the present invention will be described with reference to the attached drawings. However, the present embodiment is just an example for realizing the present invention, and it should be noted that the present embodiment does not limit the technical scope of the present invention. Common configurations in the drawings are designated with the same reference numerals.

<Configuration of Storage System>

Figure 1:
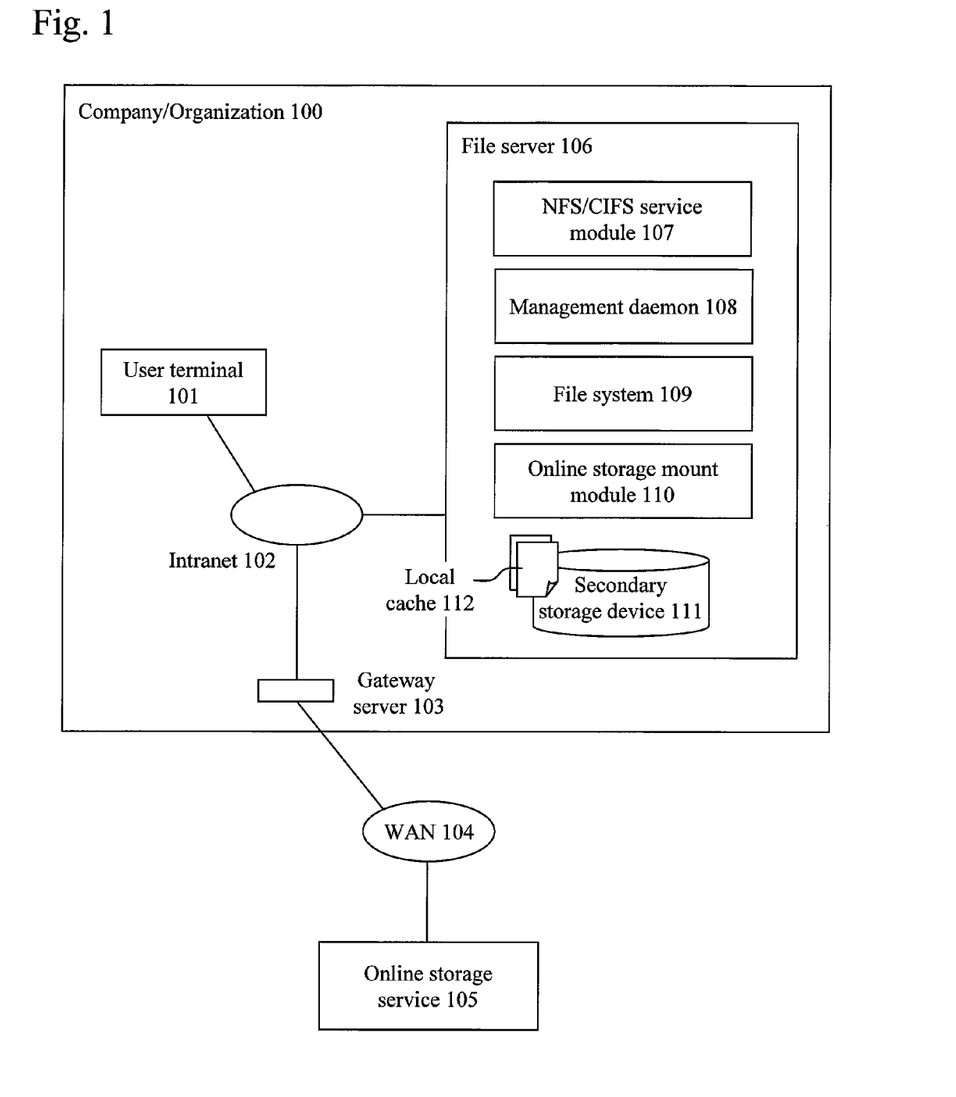
FIG. 1 is a diagram showing a schematic configuration of a storage system according to an embodiment of the present invention.

FIG. 1 is a diagram showing a schematic configuration of a storage system according to the embodiment of the present invention. The storage system includes a file server 106, at least one user terminal 101, a gateway server 103 that are arranged in a company/organization 100 as well as an external online storage service 105. The user terminal 101, the file server 106, and the gateway server 103 are connected via, for example, an intranet 102, and the gateway server 103 and an online storage service 105 are connected via a WAN 104.

A file access occurs to the file server 106 from the user terminal 101 which is also connected. The intranet 102 connects to the WAN 104 via the gateway server 103, and the online storage service 105 operates beyond the WAN 104. The online storage service 105 is a website that discloses and provides a storage service to the WAN through a Web interface, and examples of the actual service include Amazon (registered trademark) S3 and Windows (registered trademark) Azure Storage.

The file server 106, which is a file server such as NAS (Network Attached Storage), includes an NFS/CIFS service module 107, a management daemon 108, a file system 109, an online storage mount module 110, and a secondary storage device 111 including a local cache 112. The NFS/CIFS service module 107, the management daemon 108, the file system 109, and the online storage mount module 110 may be realized as modules or may be constituted by programs, and a process in the file server 106 may realize the functions according to the programs. Although the local cache 112 is arranged as an area for cache in the secondary storage device 111, the mode is not limited to this, and a memory for cache may be prepared separately from the secondary storage device 111.

The NFS/CIFS service module 107 is a basic module for receiving an access from the user terminal 101 based on an NFS or CIFS protocol and for operation as a file server, and Samba is an example of the NFS/CIFS service module 107. When authentication of the user is required, the NFS/CIFS service module 107 processes the authentication.

The online storage mount module 110 is a module for providing a function of mounting a logical drive on the online storage service in the file server 106. The logical drive corresponds to a logical storage volume on the online storage service and is equivalent to, for example, a "bucket" in Amazon (registered trademark) S3. It is assumed in the following description that the service is Amazon (registered trademark) S3, the OS of the file server is Linux, and the online storage mount module 110 is a kernel module (for example, FUSE-based file system module) including the bucket. However, the present invention is not limited by this.

The management daemon 108 is a module for setting which bucket, with whose account, and where in the file server the online storage mount module 110 will mount the bucket. The management daemon 108 provides a setting GUI (for example, see FIGS. 4 and 5). The manager can use the setting GUI displayed on a display screen of a manager terminal not shown to manage the online storage mount module 110.

The local cache 112 is stored in the secondary storage device 111 in the file server 106. The local cache 112 is a file generated and managed by the online storage mount module 10 and is a cache for speeding up the access to the file on the online storage service 105.

The following is a description of an operation summary of the file access. For example, when the user terminal 101 issues an I/O request to a file, the NFS/CIFS service module 107 provides the request to the file system 109. If the target file of the I/O request is a file stored in the secondary storage device 111, the file system 109 acquires the target file from the secondary storage device 111 and provides the file to the user terminal 101 through the NFS/CIFS service module 107. Meanwhile, if the target file is in the local cache 112 (if the file is associated with Amazon (registered trademark) S3 and cached), the file system 109 acquires the target file through the online storage mount module 110 and provides the file to the user terminal 101 through the NFS/CIFS service module 107. If the target file (file associated with Amazon (registered trademark) S3) is not in the local cache 112 either (if the target file is in the online storage service 105), the online storage mount module 110 acquires (mounts) the target file from the online storage service 105, stores the target file in the local cache 112, and provides the target file to the file system 109. The file system 109 then provides the file to the user terminal 101 through the NFS/CIFS service module 107.

<Concept of File Division Management and Divided Cache>

Figure 2:
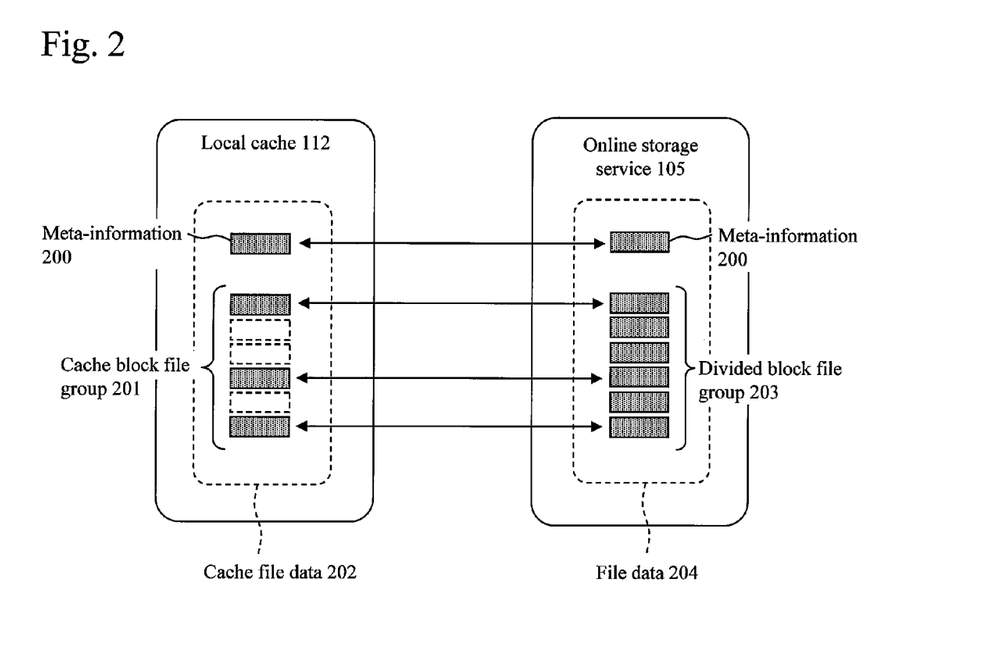
FIG. 2 is a diagram for explaining a concept of file division management and divided cache.

FIG. 2 is a diagram showing a concept of file division management and divided cache according to the embodiment of the present invention. File data 204 on the online storage service 105 is a set of divided block files (sub files) constituting a single file, and the file data 204 includes meta-information 200 and a divided block file group 203.

Figure 3:
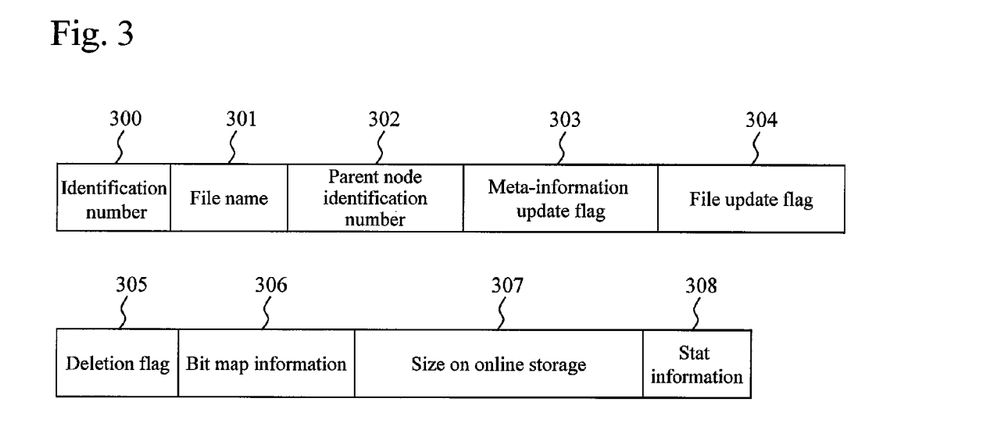
FIG. 3 is a diagram showing an example of a file attribute table stored in meta-information.

The meta-information 200 is attribute information attached to each file, and for example, the meta-information 200 includes information such as file name and update date/time (see FIG. 3 for details). The divided block file group 203 is a set of block files that are formed by dividing the file main body at a fixed size.

Meanwhile, the local cache 112 in the file server includes cache file data 202 equivalent to a set of cache files of a single file. The cache file data 202 includes the meta-information 200 and a cache block file group 201. The cache block file group 201 includes files downloaded from the divided block file group 203 by the online storage mount module 110 for a speed-up process and is a subset of the divided block file group 203 when a file update process is not generated. When the file update process is generated, corresponding updated blocks are stored, and the online storage mount module 110 overwrites and updates corresponding files in the divided block file group 203 in periodically executed update processes (see FIGS. 10 and 11).

In the actual cache data storage method in the file server 106, one directory is prepared for each cache file data 202 in the cache area of the file server 106, and the meta-information 200 and the cache block file group 201 are stored in the directory. The data is also stored in the same configuration (one directory is prepared for one file) on the online storage service 105.

<File Attribute Table>

FIG. 3 is a diagram showing an example of configuration of a file attribute table stored in the meta-information 200 according to the present embodiment. The meta-information 200 includes configuration items, such as an identification number 300, a file name 301, a parent node identification number 302, a meta-information update flag 303, a file update flag 304, a deletion flag 305, bit map information 306, a size on online storage 307, and Stat information 308.

The identification number 300 is number information for uniquely identifying the file (equivalent to the file data 204) and is the only data that does not change even if the meta-information, such as the file name and the file path, changes. The parent node identification number 302 stores an identification number of a file corresponding to the parent directory of the file when a directory configuration is adopted.

The meta-information update flag 303 and the file update flag 304 are flags set when the meta-information and the file data of the files are updated, and the flags are referenced in the periodical update processes. The flags indicate whether there is an update, and for example, 1 or 0 is stored. When a writing process is executed in the local cache, there is a mismatch between the data on the local cache 112 and the data on the online storage service 105. The flags are used to later reflect the mismatch caused by the update on the data in the online storage 105.

The deletion flag 305 is a flag set when there is a deletion process of the file (equivalent to the file data 204), and the flag is also referenced in the update processes.

The bit map information 306 is data for recording blocks, in which update processes are generated, among the locally cached block files and is used in a file update process.

The size on online storage 307 is an attribute that stores the data size of the original file when the data is downloaded from the online storage and is used to delete an excess file in the update processes.

Lastly, the Stat information 308 stores file statistical information, such as file size of the file, block size, and ACL.

<Online Storage Service Setting/Management GUI>

Figure 4:
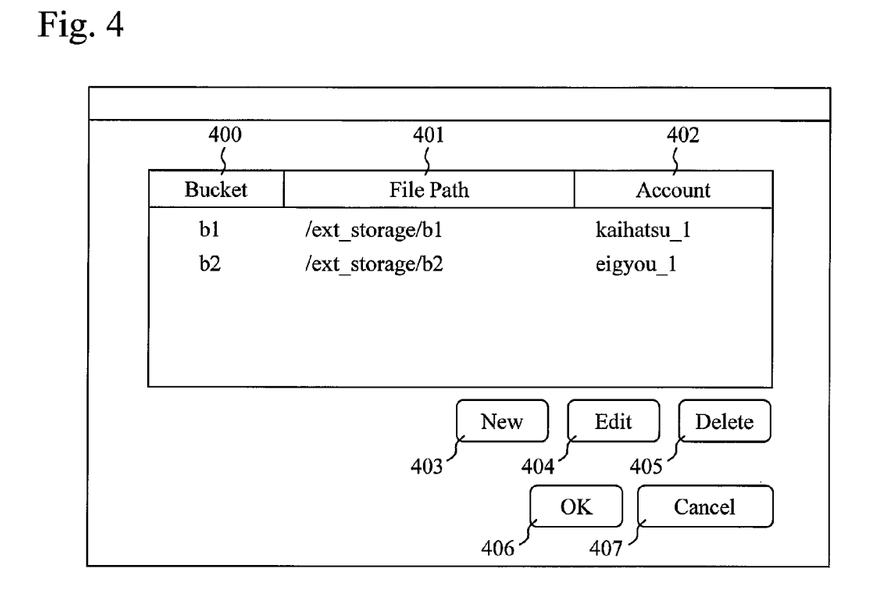
FIG. 4 is a diagram showing a setting GUI provided by a management daemon.

FIG. 4 is a diagram showing a setting/management GUI (Graphical User Interface) provided by the management daemon. The GUI is always displayed on the screen of a manger terminal not shown when the manager requests the management daemon 108 to set and/or manage the online storage service from the manager terminal.

The setting/management screen includes a list control and buttons. The list control displays a list of set data including set buckets 400, file paths 401 on the file server 106 that are mounted corresponding to the buckets, and accounts 402.

The set data indicates a set of designated bucket names of Amazon (registered trademark) S3, file paths of mount destination folders in the file server, and user account names of Amazon (registered trademark) S3 used for the mounting. When reading or writing of file is executed for a mounted folder, a usage fee is generated for the user account of Amazon (registered trademark) S3 used for the mounting.

A new button 403, an edit button 404, and a delete button 405 are arranged on the setting GUI, and an entry can be newly generated, edited, and deleted. An OK button 406 is pressed to confirm the setting content, and a cancel button 407 is pressed to cancel the setting content. As for the accounts, a contract needs to be made and the accounts need to be created by Amazon (registered trademark) S3 in advance. Access ID Key and Secret Access Key that are issued for each account and that are necessary to access the Amazon (registered trademark) S3 service are encoded and stored in the file server.

Figure 5:
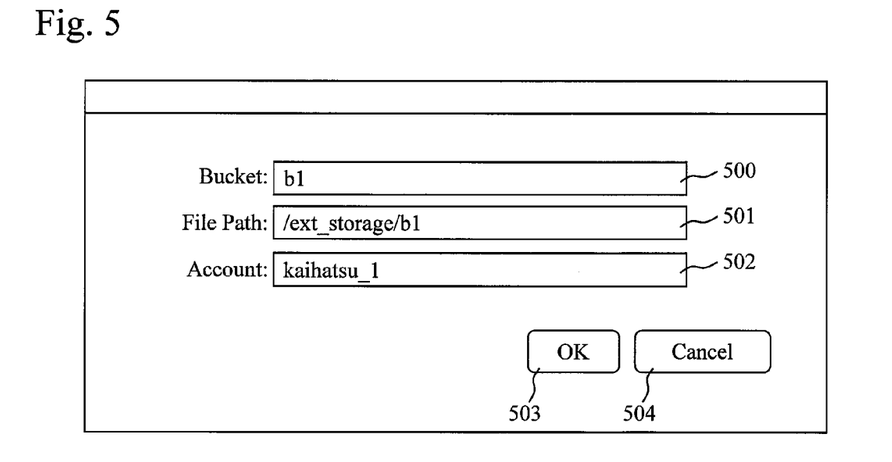
FIG. 5 is a diagram showing a GUI when a new/edit button is pressed in the setting GUI.

FIG. 5 is a diagram showing a GUI when the new or edit button is pressed in the setting/management GUI (FIG. 4). Edit boxes that can set the bucket name, the file path, and the account are arranged. An OK button 503 can confirm the setting, and a cancel button 504 can cancel the setting.

<Process in File Opening>

Figure 6:
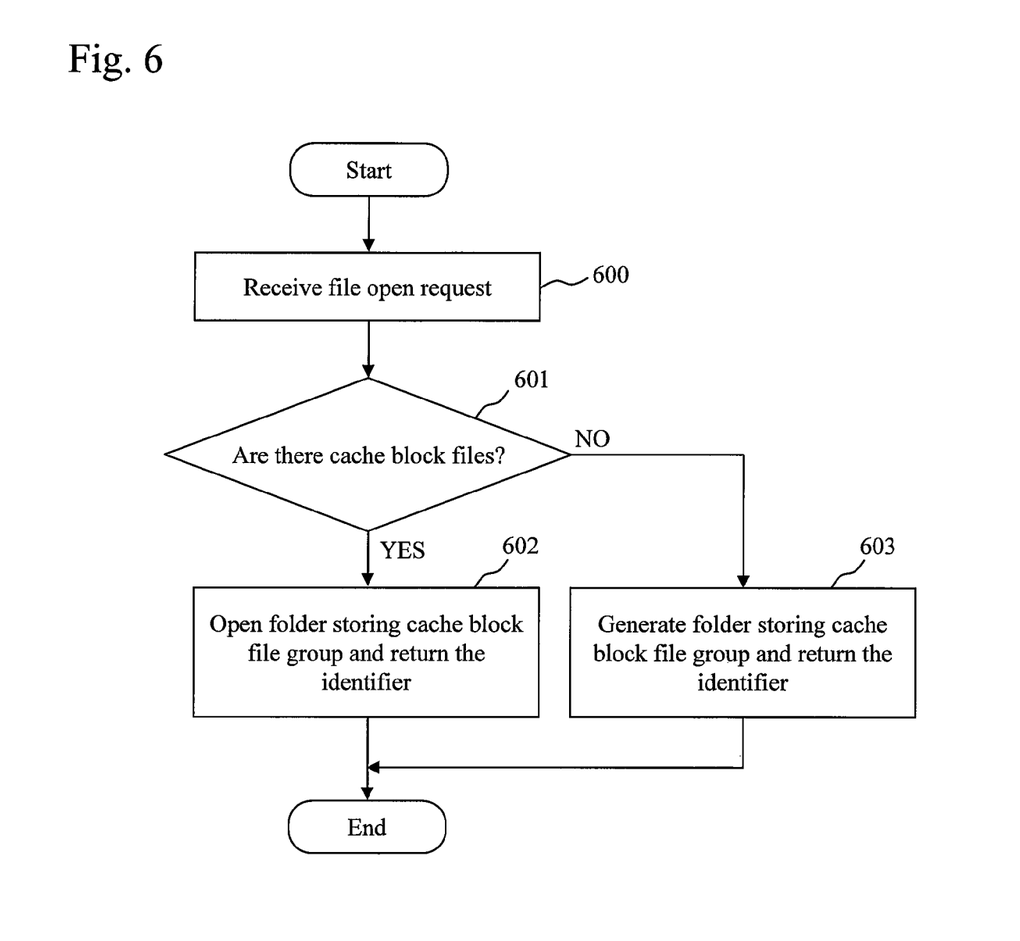
FIG. 6 is a flow chart for explaining a process of an online storage mount module in file opening.

FIG. 6 is a flow chart for explaining a process executed by the online storage mount module 110 in file opening according to the present embodiment. It can be stated that the process is a process for securing resources necessary to use a file in response to a file open request.

First, when the online storage mount module 110 receives a file open request (step 600), the online storage mount module 110 checks whether there is a cache block file group of files as the open request target in a cache area of the file server 106 (step 601).

If there is the cache area (Yes in step 601), the online storage mount module 110 opens the folder that stores the cache block file group and returns the file identifier (step 602).

On the other hand, if the cache area does not exist (No in step 601), a folder that stores the meta-information and the cache block file group is generated, and the file identifier is returned.

<Process in File READ>

Figure 7:
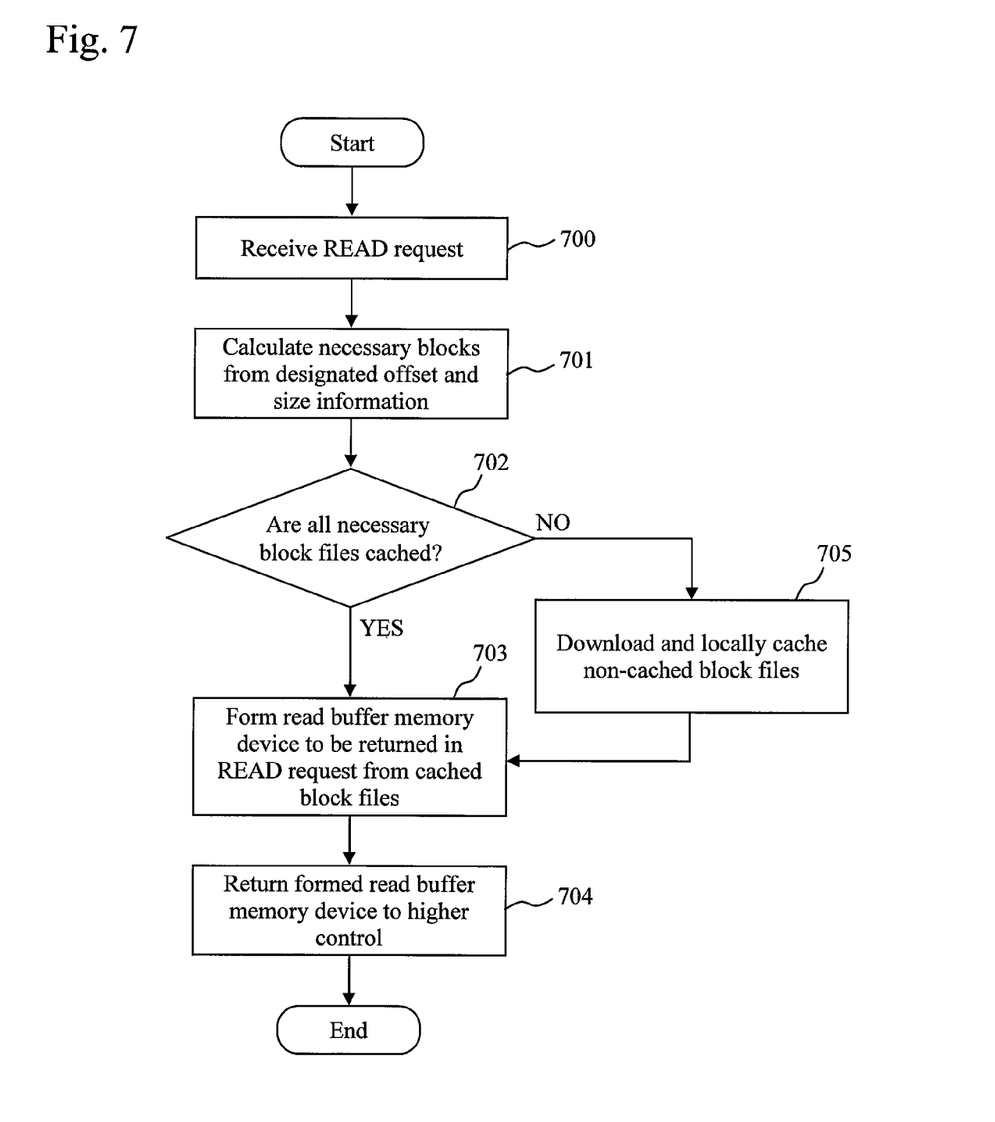
FIG. 7 is a flow chart for explaining a process of the online storage mount module in READ.

FIG. 7 is a flow chart for explaining a process executed by the online storage mount module 110 during a READ request according to the present embodiment.

When the online storage mount module 110 receives a READ request (step 700), the online storage mount module 110 calculates necessary divided blocks as destinations based on the offset information and the size information of the file designated in the READ request (step 701).

The online storage mount module 110 determines whether all divided block files necessary in providing the file are stored in the local cache 112 (step 702).

If all necessary divided block files are cached (Yes in step 702), the online storage mount module 110 reads the data of necessary areas from the cached block files and generates a buffer memory device to be returned in the READ request (step 703).

On the other hand, if at least part of the necessary divided block files is not cached (No in step 702), the online storage mount module 110 downloads the non-cached divided block file from the online storage service 105 to store the divided block file in the local cache 112 (step 705) and forms a read buffer memory device to be returned in the READ request in the same way as when the files are cached (step 703).

Lastly, the online storage mount module 110 returns the formed read buffer memory device to the higher control (the file system 109) to end the process (step 704).

<Process in File WRITE>

Figure 8:
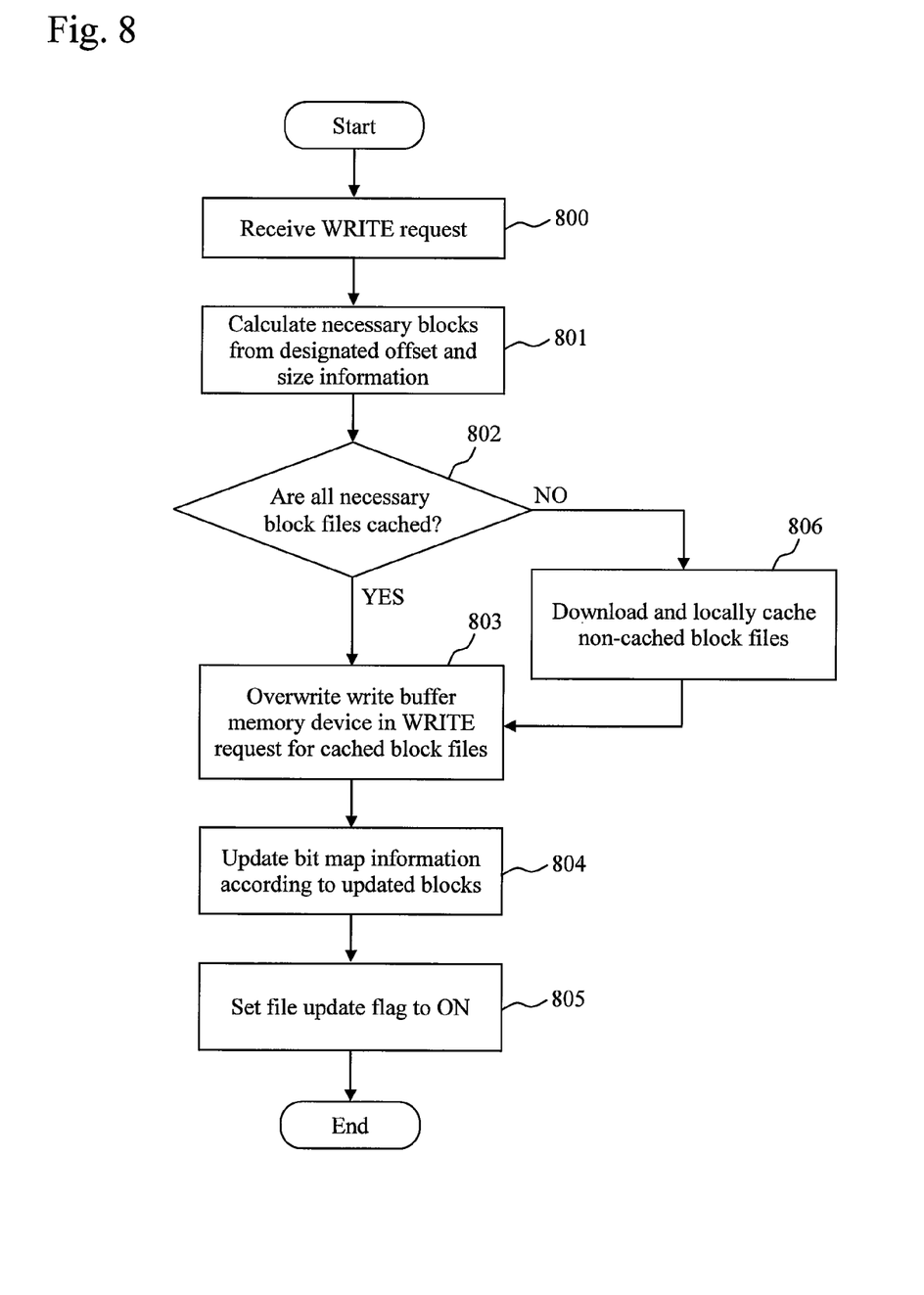
FIG. 8 is a flow chart for explaining a process of the online storage mount module in WRITE.

FIG. 8 is a flow chart for explaining a process executed by the online storage mount module 110 during a WRITE request according to the present embodiment.

When the online storage mount module 110 receives a WRITE request (step 800), the online storage mount module 110 calculates necessary divided blocks from the offset information and the size information designated in the WRITE request (step 801).

The online storage mount module 110 then determines whether all necessary divided block files that cover write areas are stored in the local cache 112 (step 802).

If part of the block files is not cached (No in step 802), the online storage mount module 110 downloads the file from the online storage service 105 and stores the file in the local cache 112 (step 806).

If all necessary block files are cached (Yes in step 802), or after all necessary block files are cached by the process of step 806, the online storage mount module 110 overwrites a write buffer memory device in the WRITE request in necessary write areas for the cached block files (step 803).

The online storage mount module 110 sets corresponding bits in the bit map information 306 to 1 in accordance with the updated block files to update the bit map information 306 (step 804).

Lastly, the online storage mount module 110 sets the file update flag 304 to ON to end the process (step 805).

<Process in File TRUNCATE>

Figure 9:
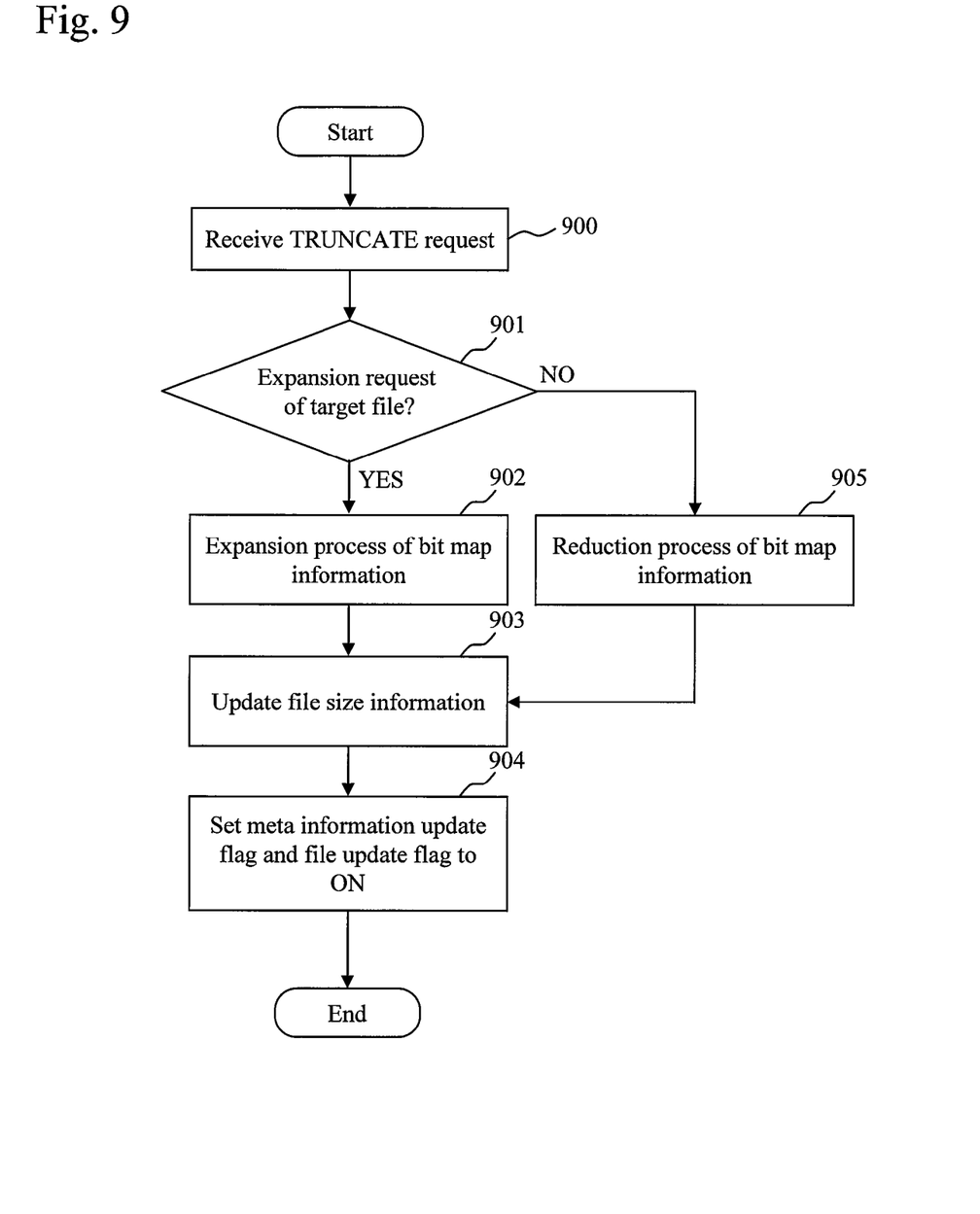
FIG. 9 is a flow chart for explaining a process of the online storage mount module in TRUNCATE.

FIG. 9 is a flow chart for explaining a process executed by the online storage mount module 110 in TRUNCATE according to the present embodiment. The TRUNCATE process is a process of the file system for executing a process of expanding and contracting the target file.

When the online storage mount module 110 receives a TRUNCATE request (step 900), the online storage mount module 110 determines whether the request is an expansion request or reduction request of file based on the designated size information (step 901).

If the request is an expansion request (Yes in step 901), the online storage mount module 110 expands the bit map information data by the amount necessary for the size after the expansion of the file (step 902) and updates the file size information (step 903).

On the other hand, if the request is a reduction request (No in step 901), the online storage mount module 110 reduces the bit map information data to a size equivalent to the size after the reduction of the file (step 905) and updates the file size information (step 903).

Lastly, the online storage mount module 110 sets the meta-information update flag and the file update flag to ON to end the process (step 904).

When the file size is reduced, there are divided block files not necessary in the reduction process, and a process of deleting the files is not executed. This is to prevent the overhead of generating the divided block files again when an expansion process is generated after the reduction.

<Asynchronous File Update Process>

Figure 10:
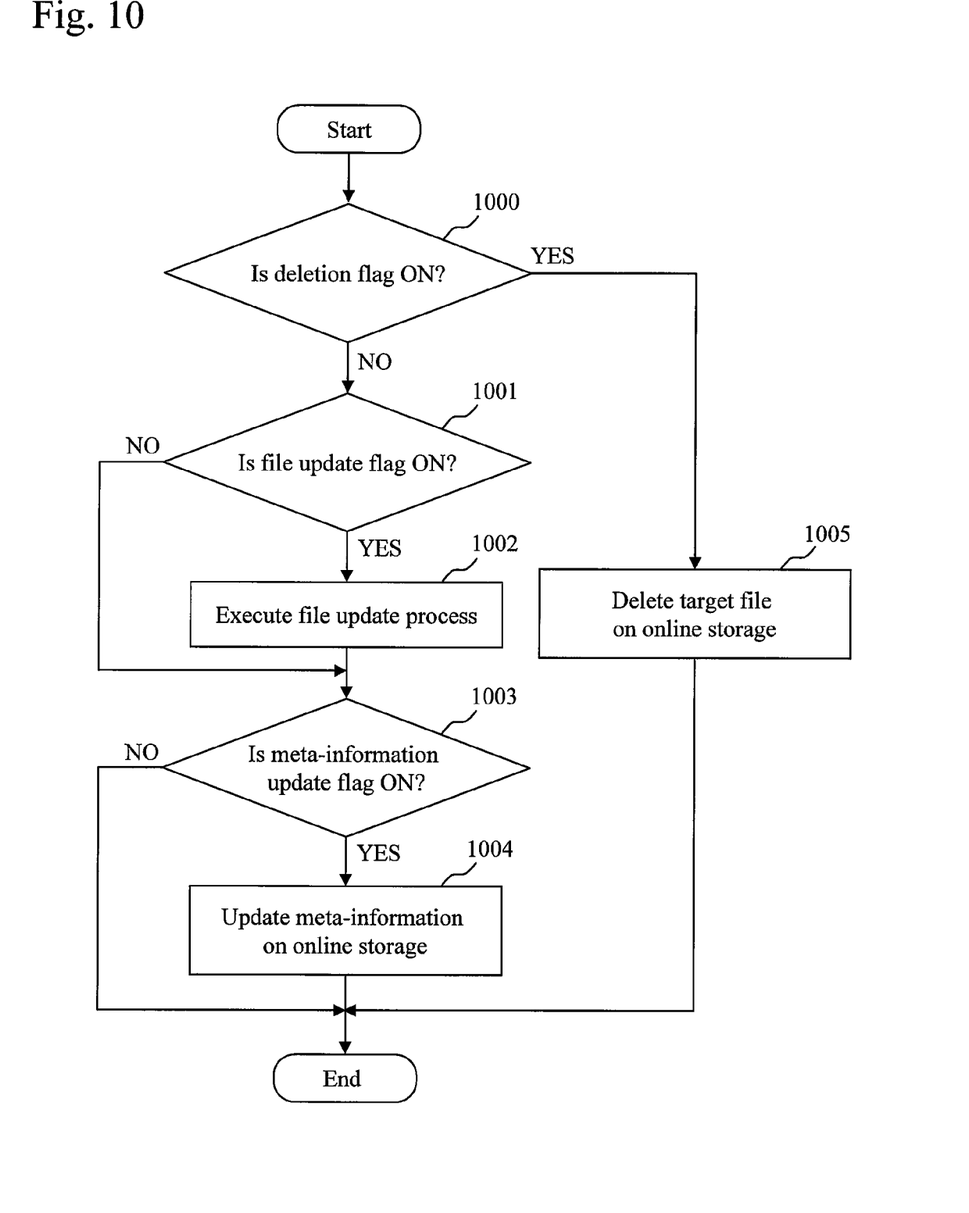
FIG. 10 is a flow chart for explaining an overall process in asynchronous update.

FIG. 10 is a flow chart for explaining an overall summary of a process in asynchronous update according to the present embodiment. The asynchronous update process is periodically executed in a separate thread, and the mechanism allows setting the period by a policy.

The online storage mount module 110 first uses an asynchronous update thread to access the meta-information of the files to check whether the deletion flag is ON (step 1000). If the deletion flag is ON (Yes in step 1000), the online storage mount module 110 deletes the target file on the online storage corresponding to the identifier (step 1005) and ends the process.

When the deletion flag is OFF (No in step 1000), the online storage mount module 110 determines whether the file update flag is ON (step 1001).

When the file update flag is ON (Yes in step 1001), the online storage mount module 110 executes a file update process (see FIG. 11 for details) (step 1002). If the file update flag is OFF, the online storage mount module 110 skips the file update process and moves the process to a determination process of the meta-information update flag (step 1003).

If the meta-information update flag is ON (Yes in step 1003), the online storage mount module 110 updates the meta-information of the corresponding file on the online storage (step 1004). If the meta-information update flag is OFF (No in step 1003), the online storage mount module 110 ends the process without executing anything.

Figure 11:
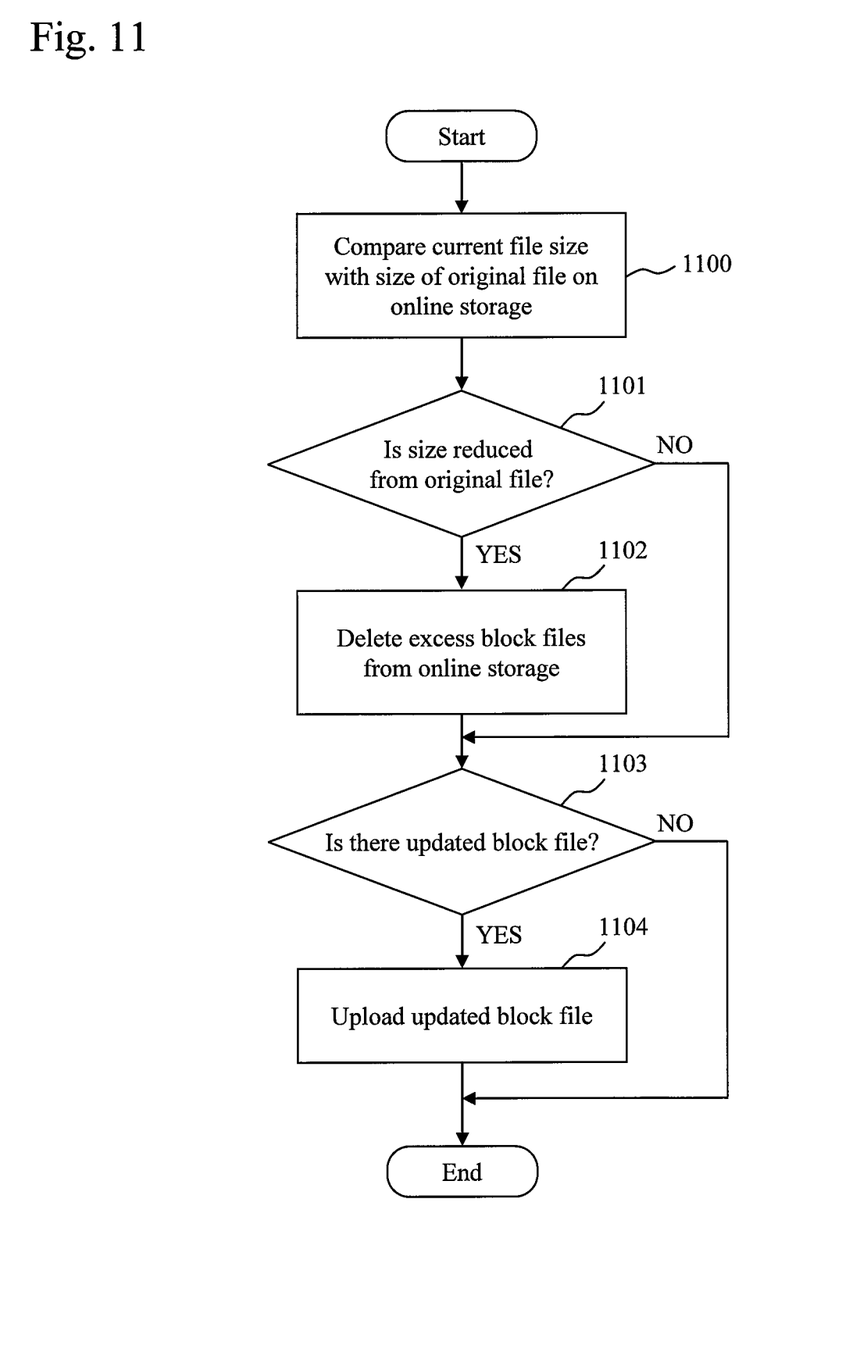
FIG. 11 is a flow chart for explaining details of a file update process in asynchronous update.

FIG. 11 is a flow chart for explaining details of the file update process (step 1002) in the asynchronous update.

The online storage mount module 110 compares the current file size with the size of the original size on the online storage service 105 that is stored in the meta-information attribute of the file (step 1100).

The online storage mount module 110 determines whether the file size is reduced at this time relative to the original file (step 1101). If the file size is not reduced (No in step 1101), there are no excess files, and the process moves to step 1103.

If the file size is reduced (Yes in step 1101), there are excess divided block files on the online storage service 105. Therefore, the online storage mount module 110 first deletes the files from the online storage service 105 (step 1102).

The online storage mount module 110 then determines the presence of updated block files (step 1103).

If there are no updated block files (No in step 1103), the online storage mount module 110 ends the file update process. On the other hand, if there are updated block files (Yes in step 1103), the online storage mount module 110 discriminates the updated block files based on the bit map information to upload the files to the online storage service 105 (step 1104) and ends the process.

In the present embodiment, the online storage mount module 110 directly performs the file deletion, the information update, and the like on the online storage in steps 1004, 1005, 1102, 1104, and the like. Alternatively, the online storage mount module 110 may instruct a processor (not shown) of the online storage service 105 for the file update and the like through the Web interface, and the processor of the online storage service 105 may perform the actual file update and the like.

<Conclusion>

In the embodiment of the present invention, the local cache of the file server stores K (positive integer, K<N) divided files among N (positive integer) divided files generated by dividing the original file stored by the online storage service. The online storage mount module (hereinafter, called "mount module") acquires data from the online storage service and the local cache. The mount module determines whether all divided blocks necessary to provide data corresponding to an I/O request exist in the local cache. If the necessary divided blocks exist, the mount module acquires the data corresponding to the file I/O request from the divided blocks. In this way, the upper-limit constraint of the file size can be eliminated. More specifically, the fees are usually charged according to the communication amount in the online storage service. The communication cost can be reduced by providing a mechanism of dividing and managing the file and downloading and caching only the necessary part on demand.

If all necessary divided blocks do not exist in the local cache, the mount module accesses the online storage service to acquire insufficient divided blocks and stores the blocks in the local cache. In this way, only necessary divided block files are downloaded and processed on demand in accordance with the request from the client, and the communication cost can be reduced.

The local cache further stores the meta-information of the original file along with the divided files. The meta-information includes the file update flag indicating whether the original file is updated and the bit map information indicating the state of N divided files. If there is a write request from the user terminal and at least one of the K divided files stored in the local cache is updated, the mount module sets the file update flag to ON and updates the bit map information corresponding to the updated divided file. The meta-information further includes the meta-information update flag indicating whether the meta-information is updated and the file size information indicating the file size. If there is a file size change request (TRUNCATE request) and the target file is expanded or reduced by the file size change request, the mount module applies an expansion process or a reduction process to the bit map information. The mount module updates the file size information and sets the meta-information update flag to ON. In this way, the original file on the online service and the meta-information can be appropriately (not in synchronous with the process in the file server) updated. The meta-information and the file are cached on the file server, and the cache data is periodically and asynchronously uploaded to the online storage in the mechanism. As a result, the meta-information access of the file and the file access can be speeded up in the access to the online storage service via the WAN.

As described, to speed up the file and meta-information accesses, the mechanism of caching the file and meta-information on the online storage service in the file server is provided, and the cached meta-information and file in the file server are asynchronously uploaded to the online storage. Therefore, a confirmation process of the update content to the online storage service is also realized in a format of a reduced load to the file server.

The present invention can also be realized by a program code of software for realizing the functions of the embodiment. In this case, a storage medium recording the program code is provided to a system or an apparatus, and a computer (or CPU or MPU) of the system or the apparatus reads out the program code stored in the storage medium. In this case, the program code read out from the storage medium realizes the functions of the embodiment, and the program code and the storage medium storing the program code constitute the present invention. Examples of the storage medium for supplying the program code include a flexible disk, a CD-ROM, a DVD-ROM, a hard disk, an optical disk, a magneto-optical disk, a CD-R, a magnetic tape, a nonvolatile memory card, and a ROM.

An OS (operating system) and the like operating on a computer may execute part or all of the actual processes based on instructions of the program code, and the processes may realize the functions of the embodiment. Furthermore, after the program code read out from the storage medium is written in the memory on the computer, a CPU or the like of the computer may execute part or all of the actual processes based on instructions of the program code, and the processes may realize the functions of the embodiment.

The program code of the software for realizing the functions of the embodiment may be distributed via a network, and the program code may be stored in a storage section, such as a hard disk and a memory, or a storage medium, such as a CD-RW and a CD-R, of the system or the apparatus. Upon the use, the computer (or CPU or MPU) of the system or the apparatus may read out and execute the program code stored in the storage section or the storage medium.

REFERENCE SIGNS LIST

100 . . . company/organization
101 . . . user terminal
102 . . . intranet
103 . . . gateway server
104 . . . WAN
105 . . . online storage service
106 . . . file server
107 . . . NFS/CIFS service module
108 . . . management daemon
109 . . . file system
110 . . . online storage mount module
111 . . . secondary storage device
112 . . . local cache
200 . . . meta-information
201 . . . cache block file group
202 . . . cache file data
203 . . . divided block file group
204 . . . file data
300 . . . identification number
301 . . . file name
302 . . . parent node identification number
303 . . . meta-information update flag
304 . . . file update flag
305 . . . deletion flag
306 . . . bit map information
307 . . . size on online storage
308 . . . Stat information

The invention claimed is:
1. A file server apparatus that acquires a file from an online storage service connected via a network to provide the file to a user terminal, the file server apparatus comprising:
a local cache that stores K divided files among N divided files generated by dividing an original file stored by the online storage service (where K and N are positive integers, and K<N);

a mount module that acquires data from the online storage service and the local cache, wherein:

the mount module determines whether all divided blocks necessary to provide data corresponding to an I/O request exist in the local cache and acquires the data corresponding to the file I/O request from the divided blocks if the necessary divided blocks exist;

the local cache further stores metadata of the original file, the metadata including file update information indicating whether the original file is updated and bit map information indicating a state of the N divided files, and if the I/O request is a write request and at least one of the K divided files stored in the local cache is updated, the mount module sets both the file update information and the bit map information corresponding to the updated divided file to information indicative of the update.

2. The file server apparatus according to claim 1, wherein:
the mount module accesses the online storage service to acquire insufficient divided blocks and stores the blocks in the local cache if all the necessary divided blocks do not exist in the local cache.

3. The file server apparatus according to claim 1, wherein:
the metadata further includes metadata update information indicating whether the metadata is updated and file size information indicating a file size, and if the I/O request is a file size change request, the mount module determines whether the file size change request is an expansion request of the target file, applies an expansion process or a reduction process to the bit map information based on the determination result, updates the file size information, and sets the metadata update information to information indicative of the update.

4. The file server apparatus according to claim 1, wherein:
the local cache further stores metadata of the original file, and if the divided data stored in the local cache is updated, the mount module updates the original file and the metadata on the online storage service according to policy information defining timing of the update process.

5. The file server apparatus according to claim 4, wherein:
the metadata includes a meta-information update flag, a file update flag, and a deletion flag, and the mount module refers to the metadata according to the policy information to delete the original file in the online storage service, update the content of the original file, and update the metadata.

6. The file server apparatus according to claim 1, wherein:
the mount module refers to the metadata according to policy information defining timing of the update process to upload only the updated divided files to the online storage service to update the original file.

7. A method of managing a storage system having an online storage service that stores an original file, and a file server apparatus that is connected to the online storage service via a network and that acquires a file from the online storage service to provide the file to a user terminal, the file server apparatus having a local cache that stores K divided files among N divided files generated by dividing the original file (where K and N are positive integers, and K<N) and a mount module that acquires data from the online storage service and the local cache, the method comprising:

determining, by the mount module, whether all divided blocks necessary to provide data corresponding to an I/O request exist in the local cache and acquiring the data corresponding to the file I/O request from the divided blocks if the necessary divided blocks exist; and accessing, by the mount module, the online storage service to acquire insufficient divided blocks and storing the blocks in the local cache if not all the necessary divided blocks exit in the local cache, wherein the local cache further stores metadata of the original file, the metadata including file update information indicating whether the original file is updated and bit map information indicating a state of the N divided files, and the method further comprising: if the I/O request is a write request and at least one of the K divided files stored in the local cache is updated, setting, by the mount module, both the file update information and the bit map information corresponding to the updated divided file to information indicative of the update.

8. The method according to claim 7, wherein:
the metadata further includes metadata update information indicating whether the metadata is updated and file size information indicating a file size, and the method further comprising: if the I/O request is a file size change request, determining, by the mount module, whether the file size change request is an expansion request of the target file, applying an expansion process or a reduction process to the bit map information based on the determination result, updating the file size information, and setting the metadata update information to information indicative of the update.

9. The method according to claim 7, wherein:
the local cache further stores metadata of the original file, and the method further comprising: if the divided data stored in the local cache is updated, updating, by the mount module, the original file and the metadata on the online storage service according to policy information defining timing of the update process.

10. The method according to claim 9, wherein:
the metadata includes a meta-information update flag, a file update flag, and a deletion flag, and the method further comprising: referring, by the mount module, to the metadata according to the policy information to delete the original file in the online storage service, update the content of the original file, and update the metadata.

11. The method according to claim 7, further comprising:
referring, by the mount module, to the metadata according to policy information defining timing of the update process to upload only the updated divided files to the online storage service to update the original file.

12. A non-transitory computer-readable storage medium which stores a program for causing a computer to function as the file server apparatus according to claim 1.

* * * * *